(12) United States Patent
Koolen

(10) Patent No.: US 12,269,362 B2
(45) Date of Patent: Apr. 8, 2025

(54) ELECTRIC VEHICLE SUPPLY EQUIPMENT, EVSE, FOR CHARGING AN ELECTRIC VEHICLE

(71) Applicant: ABB E-mobility B.V., Delft (NL)

(72) Inventor: Gertjan Koolen, Eindhoven (NL)

(73) Assignee: ABB E-mobility B.V., Delft (NL)

( * ) Notice: Subject to any disclaimer, the term of this patent is extended or adjusted under 35 U.S.C. 154(b) by 610 days.

(21) Appl. No.: 17/580,056

(22) Filed: Jan. 20, 2022

(65) Prior Publication Data

US 2022/0305936 A1  Sep. 29, 2022

Related U.S. Application Data

(63) Continuation of application No. PCT/EP2020/070656, filed on Jul. 22, 2020.

(51) Int. Cl.
*B60L 53/62* (2019.01)
*B60L 53/64* (2019.01)

(52) U.S. Cl.
CPC ............... *B60L 53/62* (2019.02); *B60L 53/64* (2019.02)

(58) Field of Classification Search
CPC .......... B60L 53/60; B60L 53/62; B60L 53/64; B60L 53/66; B60L 53/665
USPC ........................................................ 320/109
See application file for complete search history.

(56) References Cited

U.S. PATENT DOCUMENTS

| | | |
|---|---|---|
| 2013/0088198 A1 | 4/2013 | Masuda |
| 2016/0144728 A1* | 5/2016 | Harper .................... B60L 53/67 |
| | | 320/109 |
| 2017/0088001 A1* | 3/2017 | Haas ....................... B60L 53/64 |
| 2018/0050604 A1 | 2/2018 | Hare et al. |
| 2018/0170195 A1 | 6/2018 | Jefferies et al. |

(Continued)

FOREIGN PATENT DOCUMENTS

| | | |
|---|---|---|
| CN | 1305655 A | 7/2001 |
| CN | 102227613 A | 10/2011 |
| CN | 102682406 A | 9/2012 |

(Continued)

OTHER PUBLICATIONS

European Patent Office, International Search Report in International Patent Application No. PCT/EP2020/070656, 4 pp. (Sep. 25, 2020).

(Continued)

*Primary Examiner* — Nathaniel R Pelton

(74) *Attorney, Agent, or Firm* — Leydig, Voit & Mayer, Ltd.

(57) ABSTRACT

A system and method for charging an electric vehicle includes a calibrated energy meter and a calibrated time meter, wherein the calibrated energy meter is characterized by a minimum charge current that is accurately measurable due to the calibration. The system and method is configured, when charging the electric vehicle with an actual charge current during a charging session, for initially metering the actual charge current with the calibrated energy meter as long as the actual charge current is in a range between the rated charge current and the minimum charge current or a value related to the minimum charge current and thereafter, when the metered charge current falls below the minimum charge current (Imin), for metering a charge time with the calibrated time meter until the charging session ends.

18 Claims, 3 Drawing Sheets

(56) References Cited

U.S. PATENT DOCUMENTS

2019/0084435 A1    3/2019    Grace et al.

FOREIGN PATENT DOCUMENTS

| | | |
|---|---|---|
| CN | 103891086 A | 6/2014 |
| CN | 105449796 A | 3/2016 |
| CN | 105576745 A | 5/2016 |
| CN | 106469926 A | 3/2017 |
| CN | 106961136 A | 7/2017 |
| CN | 108237925 A | 7/2018 |
| KR | 10-2015-0133403 A | 11/2015 |
| WO | 2012/129104 A1 | 9/2012 |

OTHER PUBLICATIONS

European Patent Office, Written Opinion in International Patent Application No. PCT/EP2020/070656, 7 pp. (Sep. 25, 2020).

* cited by examiner

ELECTRIC VEHICLE SUPPLY EQUIPMENT, EVSE, FOR CHARGING AN ELECTRIC VEHICLE

CROSS-REFERENCE TO RELATED APPLICATIONS

This patent application claims priority to International Patent Application No. PCT/EP2020/070656, filed on Jul. 22, 2020, which is incorporated herein in its entirety by reference.

FIELD OF THE DISCLOSURE

The present disclosure relates to a system and method for an electric vehicle supply equipment, EVSE, for charging an electric vehicle with up to a rated charge current.

BACKGROUND

Electric vehicles have become very popular in many countries. For charging said vehicles with electrical energy, charging devices are being installed in public spaces such as parking lots or at private premises. Said charging devices, often referred to as electric vehicle supply equipment, EVSE, are equipped with charge cables, which are plugged by use of a charging connector into the electric vehicle. During a charging session using current charging devices, currents of 500 A or more are applied onto the charge cable for enabling what is commonly referred to as fast charging. Fast charging often uses a Combined Charging System, CCS, protocol according to IEC 61851-23 and SAE J1772 standard for charging electric vehicles both in the US and in the European Union, EU. Other common charging protocols are CHAdeMO, GB or plain AC.

EU governments recently issued the so-called Measuring Instruments Directive 2014/32/EU, abbreviated as MID, which seeks to harmonise many aspects of legal metrology across all member states of the EU. Its most prominent tenet is that all kinds of meters which receive a MID approval may be used in all countries across the EU. In regard to electric vehicle charging, the directive requires that meters must provide officially calibrated kWh energy measurement and trustworthy billing. However, AC and DC meters that are currently available have a limited range in which they provide the stated required accuracy. Outside said limited range accuracy, for example, if at an end of the charge session, the electric vehicle is charged with a much lower charge current than at the beginning of the charge session, the requirements as defined by 2014/32/EU directive may not be met if a single calibrated energy meter is used. Thus, problems may occur when a single meter is used for different ranges, like high current and low current charger outputs.

BRIEF SUMMARY OF THE DISCLOSURE

In one aspect, the present disclosure provides a solution for accurately energy measuring and respective trustworthy billing that fulfils governmental requirements, in particular, if one meter is used for two outlets serving different electric vehicles. A subsequent objective is to provide a solution for charge point operators, CPO, to discourage users to from having long charging sessions.

Thus, in one embodiment, the present disclosure describes an electric vehicle supply equipment, EVSE, for charging an electric vehicle with up to a rated charge current, comprising:

a calibrated energy meter and a calibrated time meter, whereby the calibrated energy meter is characterized by a minimum charge current that is accurately measurable due to the calibration, and the EVSE is configured, when charging the electric vehicle with an charge current during a charging session, for initially metering the charge current with the calibrated energy meter as long as the charge current is in a range between the rated charge current and the minimum charge current, or, e.g., a value related to the minimum charge current, and thereafter, when the metered charge current falls below the minimum charge current (Imin), for metering a charge time with the calibrated time meter until the charging session ends.

In one aspect, the proposed solution splits metering and, respectively, billing, of a charging session into two parts. In the first part, the actually charged current is measured by the calibrated energy meter. The measured charged current can be multiplied with a current factor for determining billing cost of said first sub-session. In the second part, charging continues, however, the actually charged current is not measured anymore. Instead, the remaining time is measured with the calibrated time meter until the charging session has ended and is, for example, multiplied with a billing factor in order to determine the amount to billed as billing cost for said second sub-session. In this fashion, the proposed embodiments assure that accuracy of the charging cost complies in all circumstances with official regulations such as the 2014/32/EU directive, even if the actual charge current is below the minimum charge current or if the calibrated energy meter is used for two different outlets configured for different rated charge currents. Further, the proposed solution helps EVSE operators to discourage users from having long charging sessions. In this disclosure, the term "actual charge current" is used, which is to be regarded as a synonym and interchangeable term for "charge current." The word "actual" expresses the difference between the charge current itself metered in the first charging phase and the metered charge time in the second charging phase, where the charge current is not metered itself but rather the time is measured, and wherein nevertheless the charge time used as basis for calculating the costs for the charging current.

The proposed solution makes use of the finding that below the so-called minimum charge current the Measuring Instruments Directive 2014/32/EU of 26 Feb. 2014, abbreviated as MID, does not state any accuracy requirement. Thus, as long as the actual current is above the minimum charge current, the MID requirements are fulfilled such that calibrated kWh energy measurement and trustworthy billing is guaranteed. In certain conditions, the minimum charge current is estimated to be about two percent of the rated charge current. However, when the actual current drops below the minimum charge current measurements conducted by the calibrated energy meter, the MID requirements will not be fulfilled anymore. Such second part of the charge session is not subject to the MID requirements mandating accurate current metering. Thus, the solution in discussion proposes to 'measure' the time for the second part and not the actually charged current anymore and, in this way, fulfil the MID requirements.

The proposed solution is also advantageous for operators of the EVSE as an EVSE operator does not want an electric vehicle to linger very long on low current thereby occupying a parking space such that the EVSE cannot be used by other electric vehicles. For said second part a kind of 'parking fee' is billed for the remainder of the charge session. A message can be displayed to the user of the electric vehicle, for example on the EVSE, on a smartphone of the user and/or on a display of the electric vehicle, when switching from current metering to time metering, for example giving the user the possibility to continue or stop the charge session.

Electric vehicle supply equipment, EVSE, also referred to as electric vehicle, EV, charging station, electric recharging point, charging point, charge point or electronic charging station, ECS, is an element in an infrastructure that supplies electric energy for recharging of electric vehicles, including electric cars, neighborhood electric vehicles and plug-in hybrids. EVSEs usually provide a range of heavy duty or special connectors that conform to the variety of standards. Such standards comprise electric vehicle fast charging systems, which often use the so-called Combined Charging System, CCS, protocol according to IEC 61851-23 and SAE J1772 standard for charging electric vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard, can be used in connection with the proposed solution.

The electric vehicle is usually connected by a charge connector via a charging cable to the EVSE. As charge currents constantly increase charging cables can be liquid cooled, as high-power charging requires DC+ and DC- conductors which can carry 500 A current at a voltage of 1000V, or even more. The liquid cooling allows the DC+ and DC- conductors within the charging cable to become thinner, and thereby easier to use, because excessive heat due to high charge currents and charging cable internal resistances are accounted for. The electric vehicle can be provided as a motor car, a bus, a van, a truck, a tractor or any other electrically powered vehicle.

The term rated charge current shall be understood as the maximum current the EVSE is intended to charge the electric vehicle or a plurality of electric vehicles connectable to the EVSE. The term calibrated in regard to the energy meter and the time meter shall be understood that the respective meter comprises a read accuracy which is well within a respective standard describing respective limits of accuracy. The term calibrated is preferably understood such that the meter is in compliance with accuracy classes that are defined in multiple standards depending on the application. For electrical meters Class A, B and C are defined in EN50470-1:2006, where Table 3 defines the current limits for the various accuracy classes. Other classes, for example 0.5, 1.0 and 2, are defined in IEC62053-11, -21 and -22. Preferably, the energy meter and/or the time meter is provided compliant with the Measuring Instruments Directive 2014/32/EU of 26 Feb. 2014 or any newer versions. In this way, the term minimum charge current shall be understood as the minimum charge current that is accurately measurable due to the calibration and/or due to being compliance with a respective certification standard such as the Measuring Instruments Directive 2014/32/EU of 26 Feb. 2014 or any newer versions. The energy meter may also be configured for measuring the actual charge current. During a charge session, charging may start with the rated charge current during a first time period or part of the charge session and declines towards the value related to the minimum charge current, for example twice the minimum charge current. During this first time period the actually charged current is measured by the calibrated energy meter. Once the actual charge current is below the value related to the minimum charge current, the calibrated time meter measures the time until charging has ended in a second time period. Charging may finish once a battery of the electric vehicle is fully charged, once the battery is charged to a predefined level, for example to 90% State of Charge, once the electric vehicle is driven away from the EVSE, once a user or an operator stops charging, or once a specific time is reached. The specific time is independent of the metered time. I.e., the time is metered in all of these cases, provided the charging has reached the second charging phase.

According to a preferred implementation, the EVSE is configured for calculating a charging cost for the charging session based on the metered actual charge current and the metered charge time. The metered actual charge current, in one embodiment, is multiplied with a current factor defining the cost for each charged kWh, and the metered charge time is preferably multiplied with a billing factor for each minute the electric vehicle is charged. The charging cost may be displayed and subsequently billed to the user of the car via known billing methods.

According to a further preferred implementation, the EVSE comprises a computerized control device configured for controlling metering by the calibrated energy meter and metering by the calibrated time meter based on the measured actual charge current. That is, the computerized control device is configured to select which type of metering is used. The type of metering may be an electrical current metering or a time metering. More specifically, the control device is configured to determine when to switch from metering the current to metering the time, and to control the switching. The selection is based on the measured charge current. The computerized control device, for example, a microprocessor or a programmable logic controller, may first control the calibrated energy meter to measure the actual charge current until the actual charge current reaches the value related to the minimum charge current. Once the value related to the minimum charge current is undershot, the computerized control device may control the calibrated time meter for measuring the time between the point of undercut until charging ends. The computerized control device preferably comprises a storage device for storing the metered charge current and the metered time, and/or communication devices for communicating wirelessly and/or wired with the Internet and/or external servers and the like.

Generally, the value related to the minimum charge current may be a random number, for example twice, three times of half the minimum charge current. According to a preferred embodiment, the value related to the minimum charge current matches the minimum charge current. In this way, it is guaranteed that regulatory requirements are always adhered to as measuring up to the minimum charge current is illustrative of the measured actual current, which is an estimation or calculation that is considered "valid."

In one embodiment, the minimum charge current is two percent of the rated charge current. Preferably, the minimum charge current depends on the calibration of the calibrated energy meter and in such a way may vary, for example, by a predefined range. According to further preferred implementations, the minimum charge current can be selected as being one, two, three, four five percent or the like relative to the rated charge current.

According to another embodiment, charging is paused for a limited duration between energy metering and time metering. Preferably, the limited duration is a preselected duration such as one, two, ten or fifteen minutes, or depends on a user interaction. For example, the user of the electric vehicle can be requested, for example, via a display of the EVSE, via a display of the electric vehicle and/or via a smartphone app, to start the second sub-session manually. Such way costs for the second sub-session may be sold separately and advertised as 'trickle-charge,' 'fill-up' service or the like.

According to one embodiment, the EVSE comprises multiple outlets with current ratings that differ more than 50% from each other or the EVSE comprises a 125 A CHAdeMO outlet and a 500 ACCS outlet which are both connected to the calibrated energy meter and the calibrated time meter. In this embodiment, the EVSE comprises two outlets, one for low current charging and the other for high current charging. In prior art implementations having only a single calibrated certified energy meter, being able to measure up to 500 A for CCS, the minimum charge current would be two percent of 500 A, or 10 A. However, a user charging via the CHAdeMO outlet would require a minimum charge current of 2.5 A. Thus, having only a single calibrated energy meter accurately metering below the minimum charge current of 2.5 A will not fulfil regulatory requirements. The proposed EVSE provide an advantageous solution for such situation, for example, if the EVSE comprises a 125 A CHAdeMO outlet and a 500 A CCS outlet with only a single calibrated and certified energy meter. In an equal manner other combinations of differently rated outlets are feasible.

In one embodiment, the calibrated energy meter conforms to EU directive 2014/32/EU of 26 Feb. 2014 or newer. As a consequence, the calibrated energy meter is provided per requirements specified in the EU directive. EU directive 2014/32/EU, also referred to as Measuring Instruments Directive, MID, governs among others that meters having a MID approval may be used in all countries across the EU.

In another aspect, the present disclosure describes a method for charging an electric vehicle by an Electric vehicle supply equipment, EVSE, with up to a rated charge current, comprising the steps, when charging the electric vehicle with an actual charge current during a charging session, of:
  initially metering the actual charge current with a calibrated energy meter, which is characterized by a minimum charge current that is accurately measurable due to the calibration, as long as the actual charge current is in a range between the rated charge current and the minimum charge current or a value related to the minimum charge current, and thereafter, when the metered charge current falls below the minimum charge current (Imin),
  metering the charge time with a calibrated time meter until the charging session ends.

The proposed method allows for complying with regulatory requirements in regard to metering actual charge current and provides an advantageous possibility for determining charge costs if the actual charge current has fallen below a minimum charge current that is not accurately measurable anymore due to the calibration respectively certification.

According to a preferred implementation, the method comprises the step of calculating a charging cost for the charging session based on the metered actual charge current and the metered charge time.

In another embodiment, the value related to the minimum charge current is the minimum charge current.

According to a further embodiment, the minimum charge current is two percent of the rated charge current.

In another embodiment, charging is paused for a limited duration between energy metering and time metering.

According to a further embodiment, the EVSE comprises multiple outlets with current ratings that differ more than 50% from each other or the EVSE comprises a 125 A CHAdeMO outlet and a 500 ACCS outlet, which are both connected to the calibrated energy meter and the calibrated time meter.

In one embodiment, the calibrated energy meter conforms to the EU directive 2014/32/EU of 26 Feb. 2014. As a consequence, the calibrated energy meter is provided as per requirements specified in this directive.

Further embodiments and advantages of the method are directly and unambiguously derived by the person skilled in the art from the EVSE as described herein.

BRIEF DESCRIPTION OF THE SEVERAL VIEWS OF THE DRAWING(S)

These and other aspects of the invention will be apparent from and elucidated with reference to the embodiments described hereinafter.

DETAILED DESCRIPTION OF THE INVENTION

Figure 1:
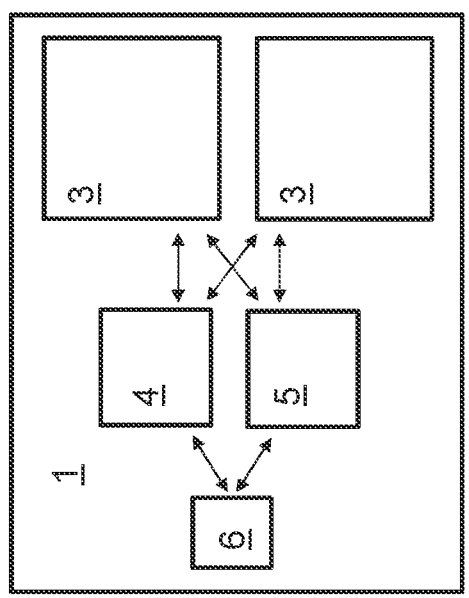
FIG. 1 shows an electric vehicle supply equipment, EVSE, for charging an electric vehicle in accordance with the present disclosure.
Figure 2:
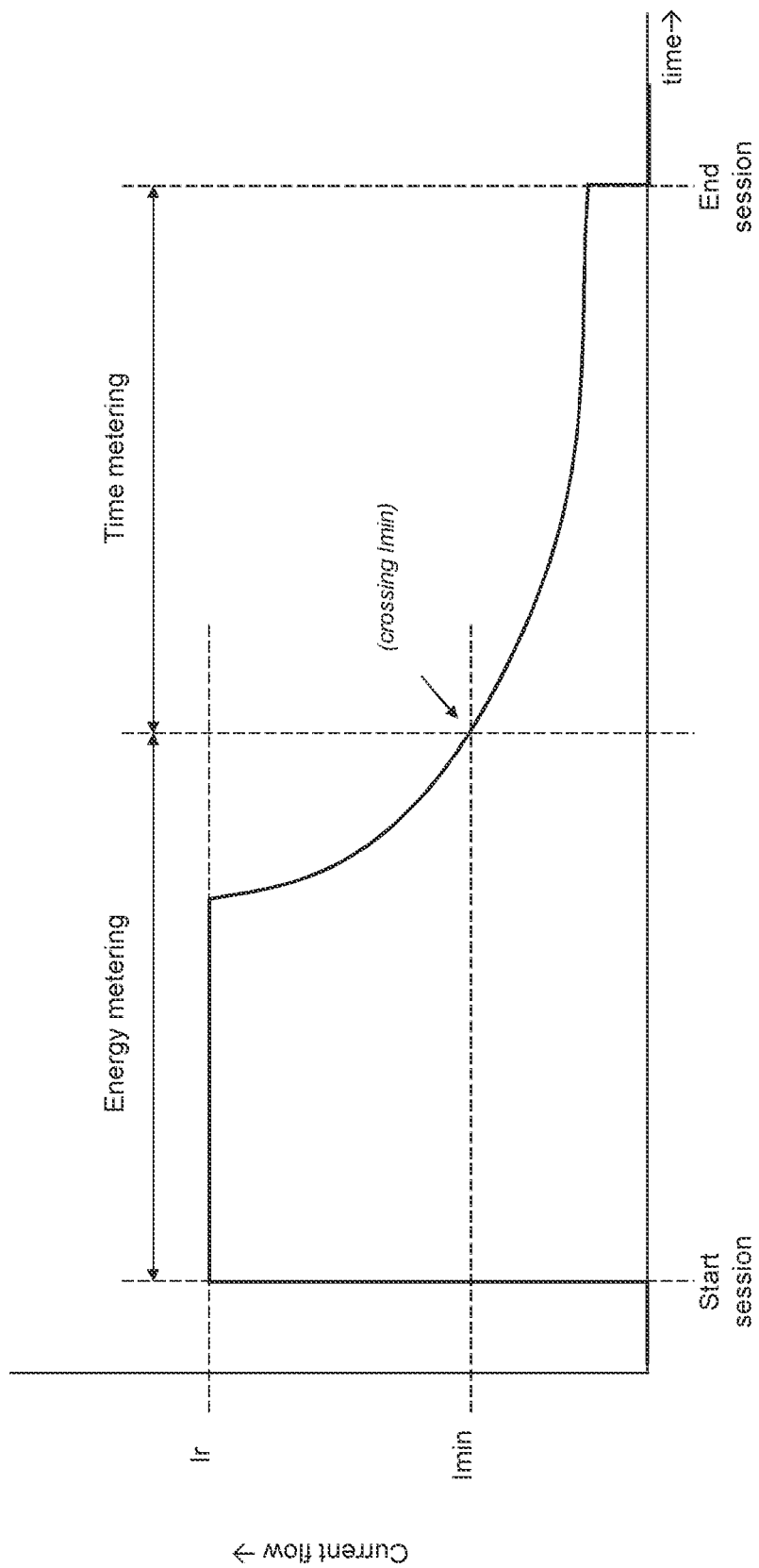
FIG. 2 shows a current flow over time when charging the electric vehicle with the EVSE according to FIG. 1 in a schematic view.
Figure 3:
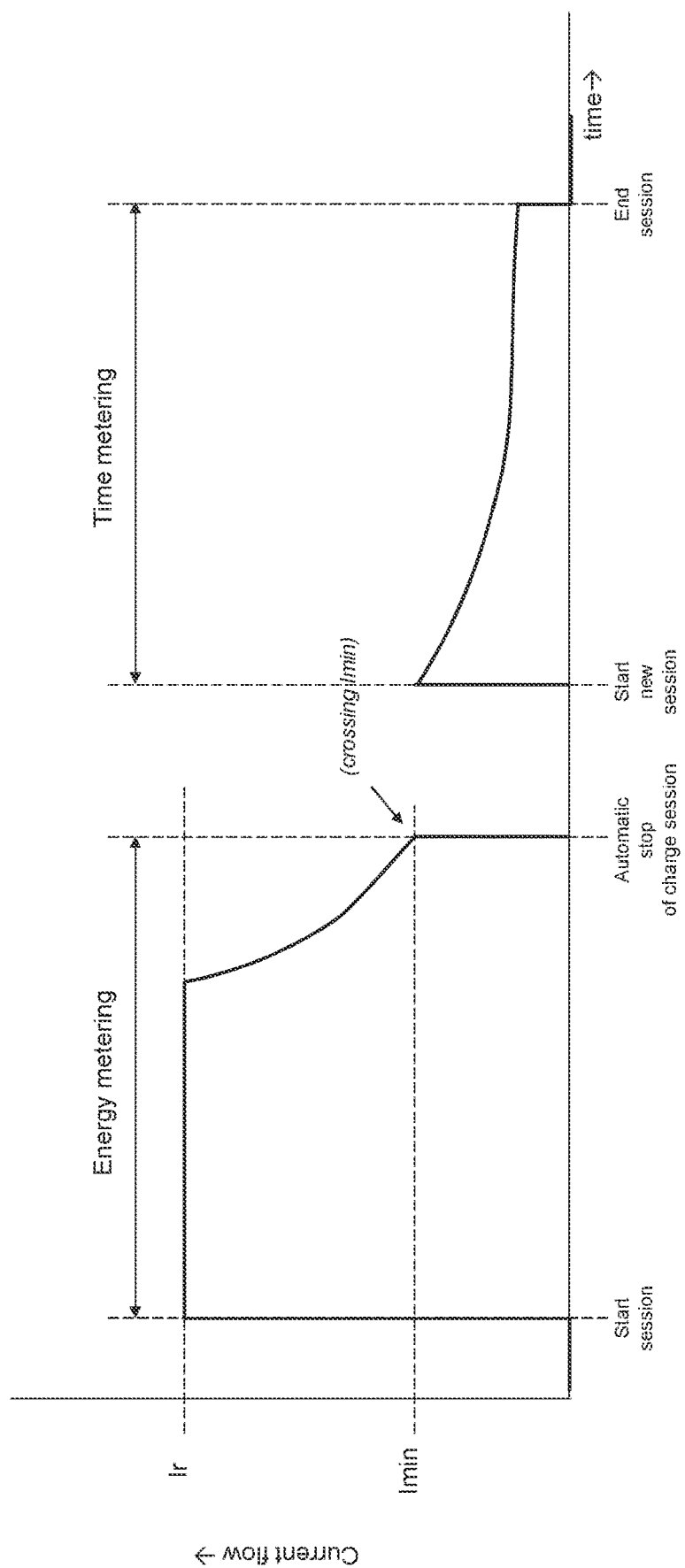
FIG. 3 shows another current flow over time when charging the electric vehicle with the EVSE according to FIG. 1 in a schematic view.

FIG. 1 shows an electric vehicle supply equipment, EVSE, 1 in schematic view for charging an electric vehicle 2 in accordance with the disclosure. Each of FIGS. 2 and 3 shows different current flows over time when charging the electric vehicle 2 with the EVSE 1 according to FIG. 1. The EVSE 1 is connected via a transformer and converter to an AC grid, each not shown, for receiving electrical energy to charge the electric vehicle 2 and, more specifically, a battery of the electric vehicle 2.

The EVSE 1 comprises two outlets 3 for charging each an electric vehicle 2 with electrical energy via a charge cable, not depicted, pluggable via a charging connector into the respective electric vehicle 2. The first outlet 3 has a 125 A CHAdeMO output, whereas the second outlet 3 has a 500 A CCS output. The EVSE further comprises a single calibrated energy meter 4 and a single calibrated time meter 5, each connected to both of the outlets 3. Calibrated means that the respective meter 4, 5 fulfils the requirements of the Measuring Instruments Directive 2014/32/EU of 26 Feb. 2014, abbreviated as MID. Specifically, as the second outlet 3 delivers a rated charge current Ir up to 500 A for charging the electric vehicle, a minimum charge current Imin of the calibrated energy meter 4 that is accurately measurable due to the calibration is two percent of 500 A namely 10 A. Thus, the calibrated energy meter 4 can accurately monitor the actually charged current in the range between 10 A and 500 A on both outlets 3 and is in such way characterized by the minimum charge current of 10 A that is accurately measurable due to the calibration, which complies with MID.

When charging the electric vehicle 2, charging starts with the rated charge current Ir, or up to the rated charge current Ir, or 500 A in case the CCS outlet 3 is used and a respective electric vehicle 2 is connected to said outlet 3. Following the current flow depicted in FIG. 2, the actual charge current, beginning with start of the charge session, first remains at the rated charge current Ir and after some charging time drops down towards the minimum charge current Imin, depicted as crossing Imin in FIG. 2, or a value related to the minimum charge current Imin, for example twice or three times the minimum charge current Imin. During this first time period, a part of the charge session that represents the actually charged current is metered by the calibrated energy meter 4. As the actually charged current is at every time between the minimum charge current Imin and the rated charge current Ir, the requirements as per the MID are fulfilled. Even if the calibrated energy meter 4 is used for more than one outlet 3, as in the present case, said MID requirements are fulfilled in all circumstances.

Once the actually charged current drops below the minimum charge current Imin, or below a value related to the minimum charge current Imin, and starts crossing Imin as depicted in FIG. 2, a second part of the charge session starts, during which not the actually charged current is metered anymore by the calibrated energy meter 4 but instead the time is metered by the calibrated time meter 5 until the charging session ends. Charging cost is then calculated on the sum of the actually charged current multiplied with a current factor for the first time period and on the measured time of the second time period multiplied with a billing factor.

For controlling metering the actually charged current with the calibrated energy meter 4, and the time when the minimum charge current Imin respectively a value related to the minimum charge current Imin is undershot, until the end of the charge session with the calibrated time meter 5, the EVSE comprises a computerized control device 6, which is also configured for calculating the overall charging cost. The so determined overall charging cost may be billed to a user of the electric vehicle 2 via the computerized control device 6 and/or displayed via the computerized control device 6 on a display of the EVSE 1 or of the electric vehicle 2.

FIG. 3 shows an alternative implementation whereby charging is paused for a limited duration between energy metering and time metering. Charging and respective metering with the calibrated energy meter 4 may automatically stop when the actual charge current reaches the minimum charge current Imin respectively the value related to the minimum charge current Imin. The user may at this point manually choose to continue charging paying by time, which may include charges for an occupied parking space. Once chosen, a new charge session starts with the actually charged current always lower than the minimum charge current Imin.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF ELEMENTS 1 electric vehicle supply equipment, EVSE
2 electric vehicle
3 outlet
4 calibrated energy meter
5 calibrated time meter
6 computerized control device
Ir rated charge current
Imin minimum charge current

What is claimed is:
1. An electric vehicle supply equipment, EVSE, for charging an electric vehicle with up to a rated charge current, comprising:
   a calibrated energy meter; and
   a calibrated time meter, wherein the calibrated energy meter is characterized by a minimum charge current (Imin) that is accurately measurable due to a calibration, wherein the EVSE is configured, when charging the electric vehicle with a charge current during a charging session, for initially metering the charge current with the calibrated energy meter as long as the charge current is in a range between the rated charge current (Ir) and the minimum charge current (Imin); and wherein when the metered charge current falls below the minimum charge current (Imin), for metering a charge time with the calibrated time meter until the charging session ends.

2. The EVSE according to claim 1, wherein the EVSE is configured for calculating a charging cost for the charging session based on the metered charge current and the metered charge time.

3. The EVSE according to claim 1, wherein the EVSE comprises a computerized control device configured for controlling metering by the calibrated energy meter and metering by the calibrated time meter based on the measured charge current.

4. The EVSE according to claim 1, wherein the EVSE is configured to stop the charging once a battery of the electric vehicle is fully charged, once the battery is charged to a predefined level, once the electric vehicle is driven away from the EVSE, once a user or an operator stops charging, or once a specific time is reached.

5. The EVSE according to claim 4, wherein the specific time is independent of the metered time.

6. The EVSE according to claim 1, whereby the minimum charge current (Imin) is two percent of the rated charge current (Ir).

7. The EVSE according to claim 1, whereby charging is paused for a limited duration between energy metering and time metering.

8. The EVSE according to claim 1, wherein the EVSE comprises multiple outlets with current ratings that differ more than 50% from each other.

9. The EVSE according to claim 1, wherein the EVSE comprises a 125 A CHAdeMO outlet and a 500 A CCS outlet, which are both connected to the calibrated energy meter and the calibrated time meter.

10. The EVSE according to claim 1, wherein the calibrated energy meter conforms to the EU directive 2014/32/EU of 26 Feb. 2014.

11. A method for charging an electric vehicle by an electric vehicle supply equipment, EVSE, with up to a rated charge current (Ir), comprising:

charging the electric vehicle with a charge current during a charging session, initially metering the charge current with a calibrated energy meter, which is characterized by a minimum charge current (Imin) that is accurately measurable due to a calibration, continuing metering the charge current while the charge current is in a range between the rated charge current (Ir) and the minimum charge current (Imin), and when the metered charge current falls below the minimum charge current (Imin), metering a charge time with a calibrated time meter until the charging session ends.

12. The method according to claim 11, further comprising calculating a charging cost for the charging session based on the metered charge current and the metered charge time.

13. The method according to claim 11, wherein the charging is stopped once a battery of the electric vehicle is fully charged, once the battery is charged to a predefined level, once the electric vehicle is driven away from the EVSE, once a user or an operator stops charging, or once a specific time is reached, wherein the specific time is independent of the metered charge time.

14. The method according to claim 11, wherein the minimum charge current (Imin) is two percent of the rated charge current (Ir).

15. The method according to claim 11, wherein charging is paused for a limited duration between energy metering and time metering.

16. The method according to claim 11, wherein the EVSE comprises multiple outlets with current ratings that differ more than 50% from each other.

17. The method according to claim 11, wherein the EVSE comprises a 125 A CHAdeMO outlet and a 500 ACCS outlet, which are both connected to the calibrated energy meter and the calibrated time meter.

18. The method according to claim 11, wherein the calibrated energy meter conforms to EU directive 2014/32/EU of 26 Feb. 2014.

* * * * *